United States Patent [19]

Gehrig et al.

[11] 4,017,100
[45] Apr. 12, 1977

[54] FLUID SUPPLY, FILTER PACK USED THEREIN AND METHOD OF ASSEMBLY

[75] Inventors: Robert G. Gehrig, Southfield; George W. Goetz, Detroit, both of Mich.

[73] Assignee: Eaton Corporation, Cleveland, Ohio

[22] Filed: Jan. 8, 1975

[21] Appl. No.: 539,220

[52] U.S. Cl. .............................. 280/736; 23/281; 55/487; 102/39
[51] Int. Cl.² ..................................... B60R 21/08
[58] Field of Search ............ 280/150 AB, 736, 740, 280/743; 23/281; 55/487, 489; 102/39

[56] References Cited

UNITED STATES PATENTS

| | | | |
|---|---|---|---|
| 3,733,180 | 5/1973 | Heineck et al. | 280/150 AB |
| 3,797,854 | 3/1974 | Poole | 280/150 AB |
| 3,827,715 | 8/1974 | Lynch | 280/150 AB |
| 3,877,882 | 4/1975 | Lette et al. | 280/150 AB |
| 3,880,447 | 4/1975 | Thorn et al. | 280/150 AB |
| 3,898,048 | 8/1975 | Barber | 23/281 |
| 3,904,221 | 9/1975 | Shiki | 280/741 |

*Primary Examiner*—Joseph F. Peters, Jr.
*Assistant Examiner*—John A. Pekar
*Attorney, Agent, or Firm*—Teagno & Toddy

[57] ABSTRACT

A fluid supply is provided for inflating a vehicle occupant restraint system of the type activated in response to a vehicle collision signal. The fluid supply includes a housing defining a fluid discharge port, combustible gas generating means disposed within the housing and means operable to activate the gas generating means to produce gaseous combustion products. A filter pack is disposed between the gas generating means and a discharge port means and includes a plurality of layers of filter material, such as fiberglass or steel wool, with each of the layers being at least as porous as the next adjacent downstream layer to cause filtration of progressively finer particles as the gaseous combustion products move downstream. This progressive filtering minimizes clogging of the filter pack. During assembly, a layer of support screen is pressed into the housing adjacent the fluid discharge port, then the layers of filter material are pressed into the housing and a relatively thin perforated plate is positioned adjacent the layers of filter material. Preferably, the filter material is pressed into the housing with a force in the range of about 4–6 tons.

14 Claims, 4 Drawing Figures

FIG. 4

FLUID SUPPLY, FILTER PACK USED THEREIN AND METHOD OF ASSEMBLY

BACKGROUND OF THE DISCLOSURE

The present invention relates to fluid supplies for inflatable vehicle occupant restraint systems, and more particularly, to a filter pack for use therein and a method for assembling the filter pack in the fluid supply.

In general, vehicle occupant restraint systems utilize some type of crash sensor which senses the rapid deceleration which occurs when the vehicle is involved in a collision. The collision signal from the sensor actuates a fluid supply which provides a quantity of inflation gas to inflate an expansible confinement and restrain the vehicle occupant. Restraint systems of the class described may be positioned in the dashboard for deployment in the passenger compartment of the vehicle or may have the fluid supply and confinement portion located on the steering wheel to restrain the driver. In the latter case, it is necessary that the fluid supply fit compactly adjacent the steering wheel hub, without extending too far toward the driver, or radially toward the rim of the steering wheel. Therefore, while the present invention is equally adapted for many occupant restraint systems, it is especially useful for such a system which is located on the steering wheel, and will be described in connection therewith. It is also well adapted for systems which utilize the combustion of solid gas-generating materials as the source of the inflation gas, especially when such gas generating materials produce gaseous combustion products including both the generating gas and particles of varying sizes.

Among the prior art fluid supplies for occupant restraint systems are those exemplified by German Pat. No. 2,325,310, in which the generated gas flows radially out of a cylindrical housing. Another type of fluid supply is exemplified by U.S. application Ser. No. 459,529, filed Apr. 10, 1974, now Pat. No. 3,984,126, and assigned to the assignee of the present invention, showing a generally cylindrical housing from which the generated gas flows axially out of one end of a cylindrical housing. Among the common features of most such prior art fluid supplies are the inclusion of a mass of combustible gas generating material and some type of filter disposed between the combustible material and the fluid discharge ports defined by the housing.

Among the problems associated with the prior art fluid supplies has been the tendency for the filters to become clogged with the fine particles of fly ash which comprise a certain, relatively small percent of the combustion product when the gas generating material burns. If sufficient clogging of the filter occurs, the flow area through which the generating gas is discharged may be restricted to the point that excessive pressure builds up within the housing, thus presenting the possibility of the fluid supply exploding rather than directing a controlled flow of inflating gas into the confinement.

Another problem relates to the phenomenon of "channelling" which occurs whenever a gap exists between the filter pack and either the outside wall of the fluid supply or the central support member. Such a gap permits a flow of the generated gas to pass around rather than through the filter, carrying hot combustion particles which may then pass through the fluid discharge port into the inflatable confinement, causing damage to the confinement and, possibly, injury to the vehicle occupant.

SUMMARY OF THE INVENTION

Accordingly, it is an object of the present invention to provide an improved fluid supply for use in a vehicle occupant restraint system which minimizes undesirable clogging of the filter pack by the various sized combustion particles.

It is a more specific object of the present invention to provide a filter pack for use in a fluid supply wherein clogging of the filter is minimized by filtering progressively finer combustion particles as the combustion products pass downstream, through the filter, toward the fluid discharge port of the fluid supply.

It is another object of the present invention to provide a fluid supply, a filter pack and an improved assembly method therefor which minimizes the problem of channelling by substantially preventing the occurrence of gaps between the periphery of the filter pack and the fluid supply housing.

These and other objects of the present invention, which will become apparent upon a reading of the following detailed description, are accomplished by the provision of a fluid supply for inflating vehicle occupant restraint systems. The fluid supply comprises a housing defining a fluid discharge port, combustible gas generating means within the housing, and means operable to activate the gas generating means. A filter means is disposed between the gas generating means and the fluid discharge port, and includes a plurality of layers of filter material, each of the layers being at least as porous as the next adjacent downstream layer.

In accordance with another aspect of the present invention, the plurality of layers of filter material includes an upstream group of layers comprising fibres having diameters in the range of about 50 microns to about 150 microns and a downstream group of layers comprising fibres having diameters in the range of about 1 micron to about 20 microns.

In accordance with still another aspect of the present invention, the filter pack comprises a plurality of layers of filter material wherein each successive layer comprises fibres having diameters from about 1 to about 4 times the diameter of the fibres in the next adjacent downstream layer.

In accordance with yet another aspect of the present invention, a layer of support screen is pressed into the housing adjacent the fluid discharge port and a plurality of layers of filter material are then pressed into the housing adjacent the support screen. Finally, a relatively thin, perforated plate is positioned within the housing adjacent the layers of filter material. Preferably, the steps of pressing are accomplished with a force in the range of about 4 tons to about 6 tons.

DESCRIPTION OF THE PREFERRED EMBODIMENTS

Figure 1:
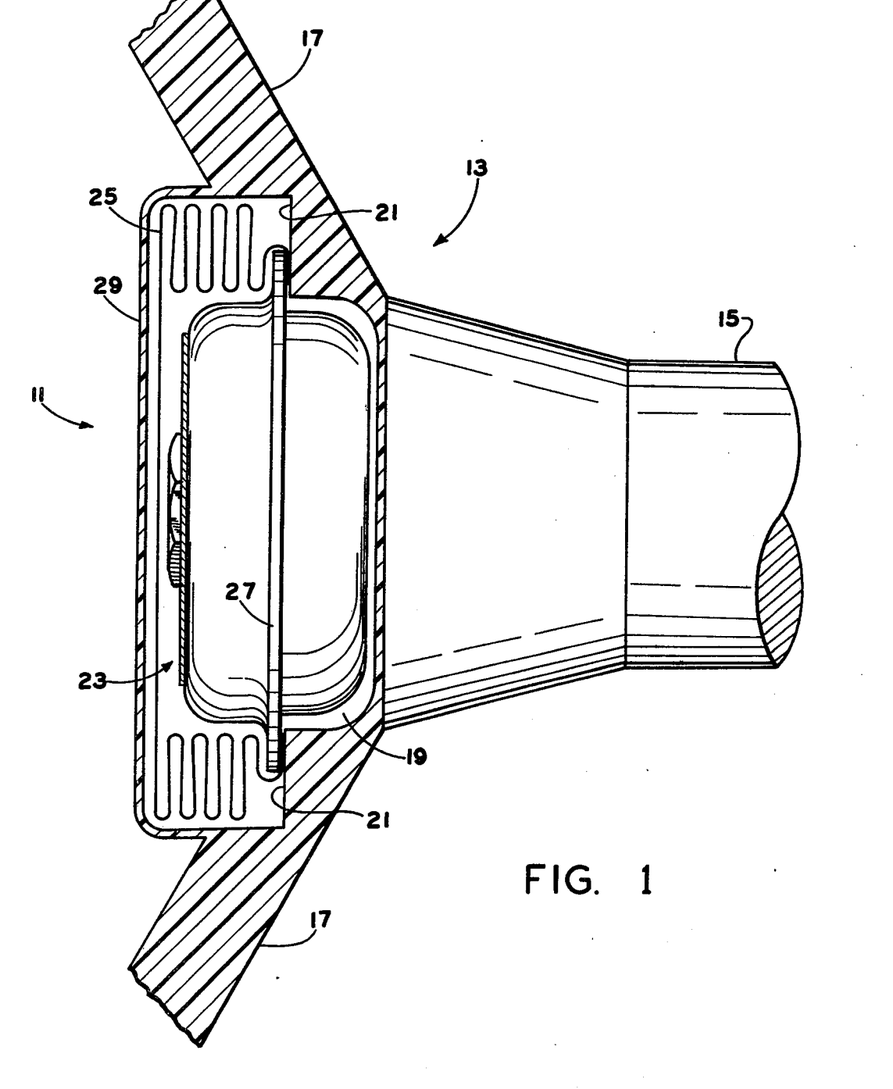
FIG. 1 is a fragmentary cross-sectional view taken through a vehicle steering wheel utilizing a fluid supply made in accordance with the present invention.

Referring now to the drawings, which are for the purpose of illustrating preferred embodiments of the present invention, and not for limiting the same, FIG. 1 is a fragmentary cross-sectional view of a vehicle steering wheel, it being understood that the present invention is usable with occupant restraint systems for protecting the occupants of many types of vehicles, including, but not limited to automobiles, trucks, boats, airplanes and the like.

Referring still to FIG. 1, an occupant restraint system, generally designated 11, is illustrated positioned on a steering wheel, generally designated 13. The occupant restraint system 11 is preferably positioned near the hub of the steering wheel 13 which also includes a steering column 15 and oppositely disposed spokes 17 extending to, and supporting the steering wheel rim (not shown). The central portion of the steering wheel 13 defines a chamber 19 and a shoulder surface 21. Within the chamber 19 is located the inflator (or fluid supply), generally designated 23. Surrounding the fluid supply 23 is an inflatable confinement 25, the peripheral edge of which is secured between the shoulder surface 21 and an outer flange 27 disposed circumferentially about the fluid supply 23. The inflatable confinement 25 is stored within an enclosure 29 which is easily rupturable to permit the expansion of the confinement 25, the rupturing of the enclosure 29 being accomplished by the use of perforations, a weakened portion, or other suitable means. When a collision signal is sent to some type of electro-explosive means well known in the art, disposed within the inflator or fluid supply 23, the propellant or other combustible material contained therein is ignited and the resulting generated inflation gas passes from the fluid supply (as will be described in greater detail subsequently), inflating the confinement 25 and forcing open the enclosure 29.

Figure 2:
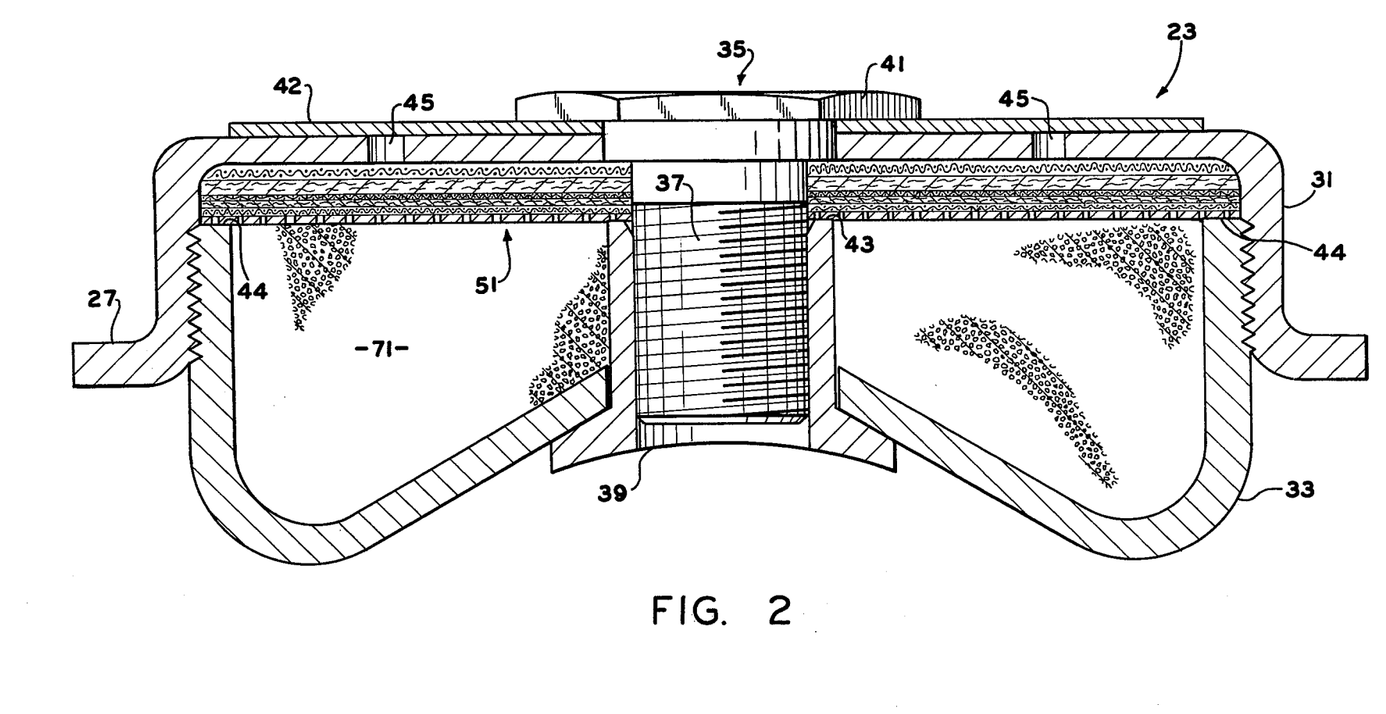
FIG. 2 is a cross-sectional view taken through the fluid supply of FIG. 1.

The cross-sectional view shown in FIG. 2 illustrates the fluid supply 23 in greater detail. The fluid supply 23 comprises a cover member 31 which is threadably connected to a base member 33. The cover member 31 terminates in an outwardly-extending portion which comprises the outer flange 27. The cover member 31 and base member 33 are centrally supported and axially restrained by a stud 35 including a threaded portion 37 whic threadedly engages the internal threads of a specially configured nut 39, which fits into a centrally disposed opening in the base member 33. The stud 35 includes a hexagonal head portion 41 in engagement with the surface of a deformable diffuser 42 which directs the inflation gas radially outward and is described in greater detail in copending U.S. application Ser. No. 459,529, filed Apr. 10, 1974, now U.S. Pat. No. 3,984,126, and which is assigned to the assignee of the present invention. The nut 39 includes a generally flat end surface 43, and the base member 33 includes a shoulder surface 44, the purpose of which surfaces will be described subsequently.

The cover member 31 defines a plurality of passages or apertures 45, which may be placed in any one of a number of patterns about the upper portion of the cover member 31. Preferably, the apertures 45 are distributed generally uniformly about the surface of the cover member 31 and are of sufficient number and size to provide suitable passage means for the inflation fluid to pass from the housing of fluid supply 23, then be directed by the diffuser 42. Because the pressure generated by the combustion of the propellant may reach about 3500 psi ($2.415 \times 10^9$ Pa) or more, it is desirable that the cover member 31 and base member 33 be made from pressure vessel steel, and in the subject embodiment, the outside diameter of the cover member 31 is about 4 inches (10.2 cm), while the wall thickness of the pressure vessel steel is about 0.156 inches (0.39 cm).

Disposed within the cover member 31, and adjacent the passages 45, is a filter pack, generally designated 51, the function of which is to accomplish the final filtering of the generated gas before it passes from the fluid supply 23. The construction and arrangement of the various layers of the filter pack 51 are among the essential features of the present invention, and will be described in greater detail subsequently.

The remainder of the chamber within the fluid supply 23, i.e., the space defined by base member 33, is substantially filled with a means 71 for generating the inflation gas needed to expand the confinement 25. As will be understood by those skilled in the art, the present invention is not related to, or dependent upon the chemical composition of the combustible material 71. However, in the subject embodiment, the combustible material comprises an azide-base mixture, such as sodium azide ($NaN_3$). For additional information regarding the chemical composition of combustible materials especially suited for use with the present invention, reference should be made to copending U.S. application Ser. No. 528,199, filed Nov. 29, 1974, now abandoned, by George W. Goetz, and assigned to the assignee of the present invention. Preferably, the combustible material is such that the combustion product comprises solid, porous sinters (or "clinkers") of varying sizes, rather than being wholly in the liquid or gaseous state.

In the cross-section assembly view of FIG. 2, the filter pack 51 is shown only somewhat schematically, and has not been discussed in detail in connection with the description of FIG. 2, but rather, will be described in greater detail in connection with the method of assembly illustrated in FIGS. 3 and 4.

Figure 3:
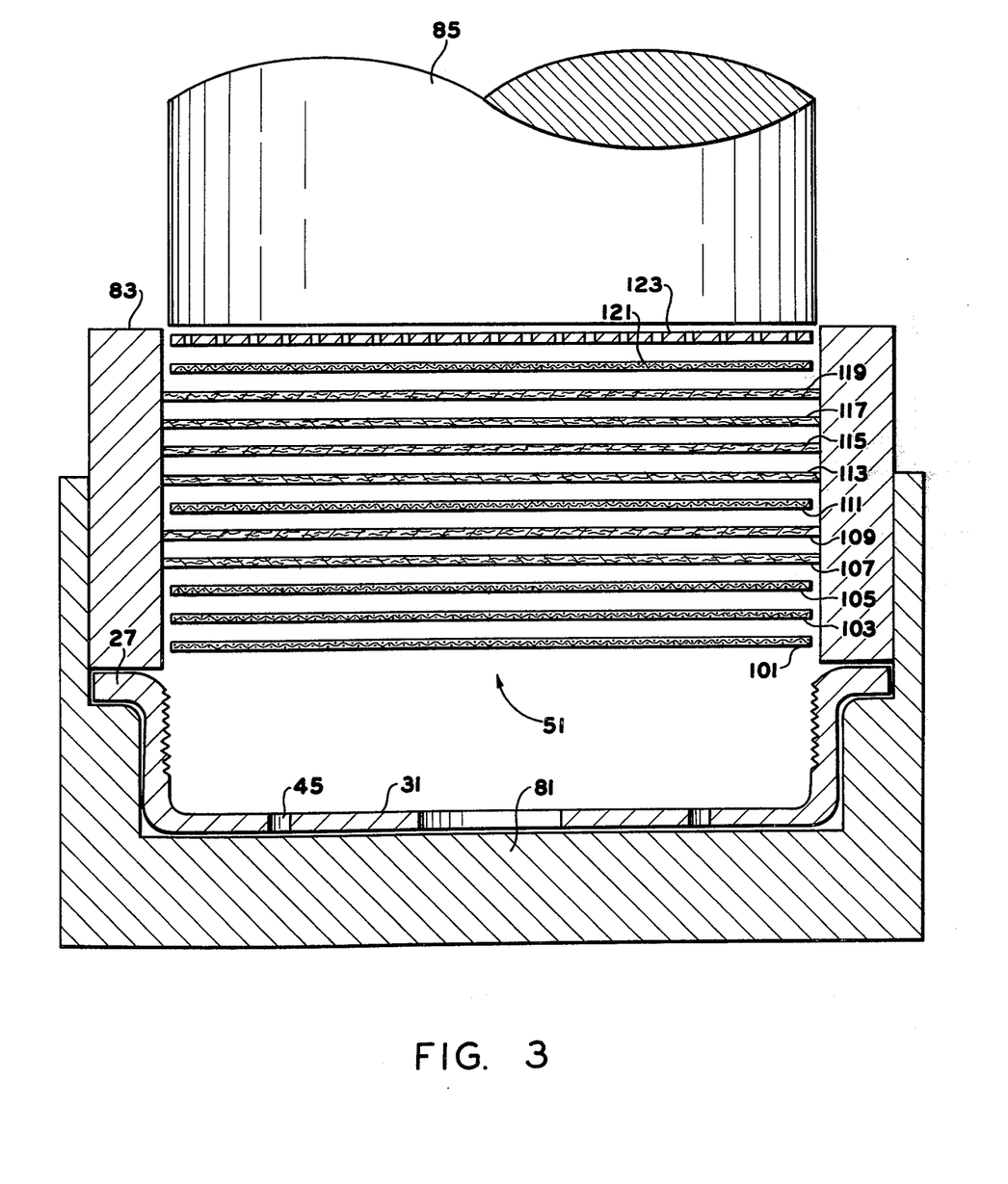
FIGS. 3 and 4 are semi-schematic, cross-sectional illustrations of the equipment employed in practicing the method of the present invention.
Figure 4:
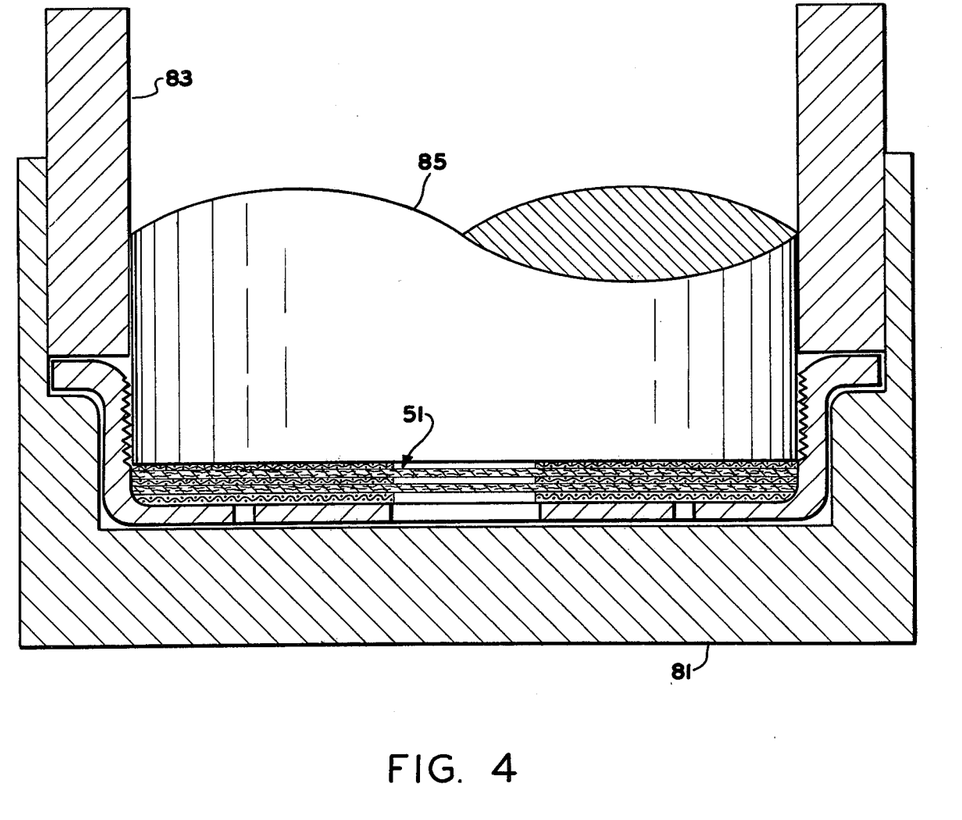

Referring now to the semi-schematic illustrations of FIGS. 3 and 4, there is represented in FIG. 3 the assembly of the filter pack 51 into the cover member 31. This may be accomplished by placing the cover member 31 within an outer support fixture 81, with an inner support fixture and guide 83 being placed within the outer fixture 81 and in engagement with the outer flange 27. The layers of material comprising the filter pack 51 are placed within the inner fixture 83 and are pressed into the cover member 31 by means of a ram 85 which, in the subject embodiment, exerts a pressing force of about 4 tons to 6 tons, until the ram 85 and filter pack 51 are in the position shown in FIG. 4. Although the various layers comprising the filter pack 51 are illustrated in a spaced-apart relationship in FIG. 3, for ease of illustration, it will be understood by those skilled in the art that the layers will be in contact with each other when placed within the inner fixture 83, prior to being pressed into the cover member 31.

In connection with the detailed description of the filter pack 51, which will be in reference to FIG. 3, it should be noted that it is an essential feature of the present invention that as the inflation gas passes generally downstream through the filter pack 51, i.e., toward the apertures 45, progressively finer particles of the combustion products are removed from the stream of generated gas. As a result, filtering of the combustion products occurs throughout substantially the entire axial dimension of the filter pack 51, rather than occurring almost entirely on the same plane of the filter, thus causing clogging across that plane. To accomplish this progressive filtering action, the successive layers of the filter pack 51 generally decrease in porosity in the downstream direction, and preferably, each layer is at least as porous as the next adjacent downstream layer.

In the subject embodiment, the filter pack 51 includes layers of screen 101, 103 and 105, the main function of which is to provide mechanical support for the adjacent layers of filter material. Adjacent screen 105 are layers 107 and 109 of a material such as glass fiber. Next is another layer of screen 111, again for mechanical support. Adjacent screen 111 are layers 113, 115, 117 and 119, each comprising steel wool. The layers 113 through 119 are supported and separated from the combustible material 71 by a layer of screen 121 and a thin, perforated metal plate 123.

In the preferred form of the assembly method of the present invention, as represented by FIG. 4 rather than by FIG. 3, the layers of screen 101–105, 111 and 121 already have central openings to provide for stud 35. The layer of screen 101 is pressed into the cover member 31 to cause the screen 101 to conform to the internal configuration of the cover member. Subsequently, screen layers 103 and 105 are placed within the cover member in contact with the screen layer 101, then layers 107 through 121 are placed, as a group, within inner fixture 83 and are pressed into the cover member under a force of about 5 tons as described previously. Finally, the plate 123 is positioned within the cover member on top of the screen 121, but need not be pressed into place. Some type of pointed piercing tool may then be used to form a central opening in each of the layers not already having such an opening, such as the layers of fiberglas 107, 109 and 113–119. It may be seen from FIG. 3 that not all of the layers appear to have the same diameter, and in the subject embodiment, the layers of screen as well as the plate 123, have a diameter of about 3.75 inches (9.5 cm), or just slightly less than the inside diameter of the cover member 31, while the layers of filter material (both the steel wool and the glass fiber) have a diameter of about 4 inches (10.04 cm). As a result, when the filter pack is pressed into the cover member, the larger layers of steel wool and glass fiber are radially compressed to seal tightly about the inner surface of the cover member 31 and prevent channelling of the inflation gas, i.e., passage of the gas around the filter without filtration occurring.

Referring again to the detailed view of the filter pack 51 as in FIG. 3, preferably, the perforations in the plate 123 are in the range of about 2000 to 4000 microns and the openings in the screen 121 are in the range of about 500 to 1000 microns. On the downstream side of the filter pack 51, the screen 101 has a mesh size in the range of about 4 to 20 (National Bureau of Standards, U.S. Standard testing sieve, market grade or equivalent), screen 103 has a mesh size in the range of about 20 to 100, and screen 105 has a mesh size in the range of about 100 to 200. The intermediate layer of support screen 111 has a mesh size in the range of about 50 to 150.

It should be clearly understood that when reference is made to successive downstream layers of filter material being less porous, or each layer being at least as porous as the adjacent downstream layer, such reference is to only the layers of material which are included for the purposes of filtering, i.e., layers 107, 109, 113, 115, 117 and 119. Layers 113 through 119 preferably comprise fibers having diameters in the range of 50 microns to about 100 microns, whereas layers 107 and 109 comprise fibers having diameters in the range of about 1 micron to about 20 microns. It will be appreciated by those skilled in the art that the particular construction and arrangement of the various support screens (101 – 105, 111 and 121), and even the inclusion thereof, are optional and not of the essence of the preset invention, although it is the presently preferred practice to include some form of support means between the filter pack 51 and the apertures 45 to prevent te filter material from being blown through the apertues by the force of the combustion. Instead, the primary feature of the present invention is the progressive change in the porosity of the layers of filter material, with each successive layer comprising fibers having diameters preferably from about 1 to about 4 times the diameter of the fibers in the next adjacent downstream layer.

In connection with the following examples, it should be noted that for the layers of screen, porosity is given in terms of mesh size, i.e., the number of openings in the screen per linear inch, whereas, for the filter material, porosity is expressed in terms of fiber size, but because the layers were pressed into the cover member under about 5 tons of force, there is substantial proportionality between fiber size, inter-fiber space, and hence, porosity, It should also be noted that in the subsequent examples, the number and arrangement of layers of filter material was not exactly as is shown in FIG. 3. However, the layers have been referred to by the reference numerals utilized in FIG. 3 to the extent that the examples are consistent therewith.

EXAMPLE A

| Layer | Material | Porosity |
| --- | --- | --- |
| 123 | perforated plate | 3000 microns |
| 121 | screen | 24 mesh |
| 119 | steel wool | 150 microns |
| 117 | steel wool | 150 microns |
| 115 | steel wool | 100 microns |
| 113 | steel wool | 50 microns |
| — | fiberglas | 3.5 microns |
| 111 | screen | 100 mesh |
| 109 | fiberglas | 3.5 microns |
| 107 | fiberglas | 1.0 micron |
| 105 | screen | 150 mesh |
| 103 | screen | 24 mesh |
| 101 | screen | 8 mesh |

The un-numbered layer of glass fiber, as well as layer 109 were a high temperature glass fiber sold under the trade name "Cerafelt" by Johns-Manville Corp. and layer 107 was another high temperature glass fiber sold under the trade name "Q-Felt," also by Johns-Manville. The filter pack of this Example was observed to provide satisfactory results.

EXAMPLE B

For this example, the filter pack was identical to that of Example A, except that the two layers of Cerafelt had the glass shot washed out, leaving essentially only the fibers. Better filtering results were observed with this filter pack.

EXAMPLE C

In this Example, layers 101–105 and 121 and 123 were identical to Example A and the remaining layers were as follows:

| Layer | Material | Porosity |
|---|---|---|
| 119 | steel wool | 100 microns |
| 117 | steel wool | 100 microns |
| 115 | steel wool | 50 microns |
| 113 | fiberglas | 18 microns |
| — | fiberglas | 8 microns |
| 111 | screen | 100 mesh |
| 109 | fiberglas | 2.5 microns |
| 107 | (none) | |

The un-numbered layer of glass fiber as well as layer 113 were a high-temperature glass fiber sold under the trade name "PH Blanket" by Carborundum Corp., and the layer 109 was another high temperature, washed glass fiber sold under the trade name "Lo Con," also by Carbonundum. This filter pack provided the best filtering of the three Examples.

The invention has been described with reference to a preferred embodiment. Obviously, modifications and alterations will occur to others upon reading and understanding of the specification. It is our intention to include all such modifications and alterations insofar as they come within the scope of the present invention.

Having thus defined our invention, We claim:

1. A fluid supply for inflating a vehicle occupant restraint system of the type activated in response to a vehicle collision signal; said fluid supply comprising;
   a. housing means defining an enclosure having fluid discharge port means;
   b. combustible gas generating means disposed within said enclosure said generating means being operable upon ignition to produce gas and combustion products;
   c. means operable to activate said gas generating means in response to said collision signal; and
   d. filter means disposed in said enclosure between said gas generating means and said fluid discharge port means, said filter means including a plurality of layers of fibrous filter material each of said layers being at least as porous as the next adjacent downstream filter layer, at least the filter layer furthest downstream being fibrous material comprising fibers having diameters less than about twenty microns, said filter means causing filtration of progressively finer of said combustion products as said gas and said combustion products move downstream toward said fluid discharge port means, to minimize clogging of said filter means, said filter means including edge means sealing the margins of said layers with said enclosure to prevent by-pass of said gas and combustion products around said filter means to said discharge port means, said filter means further including porous support means intermediate selected ones of said fiber layers.

2. A fluid supply as defined in claim 1 wherein said filter means includes first support means disposed between said layer of filter material and said gas generating means and second support means disposed between said layers of filter material and said fluid discharge port means.

3. A fluid supply as defined in claim 2 wherein said first support means comprises a relatively thin perforated plate.

4. A fluid supply as defined in claim 3 wherein said first support means further comprises a layer of screen disposed between said perforated plate and said layers of filter material, said perforations being in he range of 2000–4000 microns and said screen having openings in the range of 500–1000 microns.

5. A fluid supply as defined in claim 2 wherein said second support means includes a plurality of layers of screen, each of said layers of screen having a substantially higher mesh number than the next adjacent downstream layer.

6. A fluid supply as defined in claim 5 wherein said layer of screen on the upstream side of said second support means has a mesh number in the range of about 100–200 and said layer of screen on the downstream side has a mesh number in the range of about 4–20.

7. A fluid supply as defined in claim 1 wherein said plurality of layers of filter material includes:
   a. an upstream group of layers comprising fibers having diameters in the range of about 50 microns to about 150 microns; and
   b. a downstream group of layers comprising fibers having diameters in the range of about 1 micron to about 20 microns.

8. A fluid supply as defined in claim 7 wherein said upstream group of layers comprises fibers of steel wool and said downstream group of layers comprises glass fibers.

9. A fluid supply as defined in claim 8 wherein said glass fibers consists essentially of fibers which are substantially free of glass shot.

10. A fluid supply as defined in claim 1 wherein each successive layer of said plurality of layers of filter material comprises fibers having diameters from about one to about four times the diameters of the fibers in the next adjacent downstream layer.

11. A fluid supply for inflating a vehicle occupant restraint system of the type activated in response to a vehicle collision signal, said fluid supply comprising:
   a. housing means including means defining an enclosure having fluid discharge port means;
   b. combustible gas generating means disposed within said enclosure, said generating means being operable upon ignition to produce gas and combustion products;
   c. means operable to activate said gas generating means in response to said collision signal; and
   d. filter means disposed within said enclosure and between said gas generating means and said fluid discharge port means, said filter means including a plurality of regions of filter material, each of said regions comprising at least one. layer of fibrous filter material, and each of said regions having a greater overall porosity than the next adjacent downstream region of filter material, the furthest downstream region of filter material including fibers having diameters less than about twenty microns, said filter means causing filtration of progressively finer of said combustion products as said gas in said combustion products move downstream towards said fluid discharge port means, to minimize clogging of said filter means with said layers of fiber material received in said enclosure with the margins thereof in interference fitting relationship with said enclosure for preventing by-pass of said gas and combustion products around said filter means, said filter means including porous support means disposed between adjacent ones of said regions.

12. A fluid supply for inflating a vehicle occupant restraint system of the type activated in response to a vehicle collision signal, said fluid supply comprising:
 a. housing means including means defining an enclosure having fluid discharge port means;
 b. combustible gas generating means disposed within said enclosure defining means, said generating means being operable upon ignition to produce gas and combustion products;
 c. means operable to activate said gas generating means in response to said collision signal; and
 d. filter means disposed between said gas generating means and said fluid discharge port means, said filter means including an upstream, relatively coarse filter region and a downstream, relatively fine filter region, said coarse filter region including a plurality of layers of steel wool comprising fibers having diameters in the range of about 50 microns to about 150 microns, said fine filter region including a plurality of layers of glass fiber material comprising fibers having diameters in the range of about 1 micron to about 20 microns, said filter means including porous support means disposed between said coarse and fine filter regions, and said filter means further including means sealing the margins of said layers with said enclosure defining means to prevent bypass of said gas and combustion products around said filter means to said discharge port means.

13. A fluid supply of the type capable of inflating an inflatable confinement in sufficient time to absorb impact by the occupant for preventing occupant injury upon the vehicle experiencing a collision, said fluid supply comprising:
 a. housing means defining an enclosure having a plurality of gas discharge ports, said means including a member having a cup-shaped configuration with a plurality of gas discharge ports formed in the closed end of said cup-shape;
 b. filter means received in said enclosure and disposed closely spaced said discharge ports including at least two layers of fibrous material with each layer having fibers greater than less than four times the diameter of the fibers of the next adjacent downstream layer with the margins of said layers contacting the walls of said cup-shape in an interference fitting relationship for providing fluid pressure sealing between said layers and said cup wall for preventing by-pass flow of gas and combustion products around said filter means, said filter means including porous support means intermediate selected adjacent ones of said layers of fibrous material;
 c. means defining a plenum intermediate said filter means and said discharge ports;
 d. gas generating means disposed in said enclosure and including combustible chemical material which, upon ignition, burns to yield gas and products of combustion; and,
 e. means operative upon receipt of a collision signal to ignite said combustible material.

14. A fluid supply of the type capable of inflating an inflatable confinement in sufficient time to absorb impact by the occupant for preventing occupant injury upon the vehicle experiencing a collision, said fluid supply comprising:
 a. housing means including wall means defining an enclosure having a plurality of discharge port means therethrough;
 b. gas generating means disposed within said enclosure including combustible material operable upon ignition to burn and generate gas and products of combustion;
 c. filter means disposed within said enclosure, said filter means including at least two layers of fibrous material with each layer received in said enclosure intermediate said gas generating means and said port means and having the margins thereof inwardly compressed by said wall means for preventing by-pass of said gas and combustion products, said filter means including porous support means disposed intermediate selected ones of said layers of fibrous material;
 d. means defining a plenum intermediate said filter means and said discharge ports;
 e. means operable to activate said gas generating means in response to a collision signal.

* * * * *

UNITED STATES PATENT AND TRADEMARK OFFICE
CERTIFICATE OF CORRECTION

PATENT NO. : 4,017,100

DATED : 4/12/77

INVENTOR(S) : Robert G. Gehrig; George W. Goetz

It is certified that error appears in the above-identified patent and that said Letters Patent are hereby corrected as shown below:

| | |
|---|---|
| In the abstract, line 10: | "fiberglass" should read---fiberglas---. |
| Col. 3, line 48: | "whic" should read---which---. |
| Col. 4, line 9: | "(0.39 cm)" should read---(.39 cm)---. |
| Col. 5, line 39: | "fiberglas" should read ---glass fiber---. |
| Col. 6, line 14: | "preset invention" should read---present invention---. |
| Col. 6, lines 18,19: | "aper-tues" should read---apertures---. |
| Col. 7, line 20: | "glass fiber" should read---fiberglas---. |
| Col. 8, line 4 of Claim 3: | "he range" should read---the range---. |
| Col. 10, Claim 13, line 2: | Delete "than" first occurrence, and insert ---but--- in place thereof. |

Signed and Sealed this twelfth Day of July 1977

[SEAL]

Attest:

RUTH C. MASON
*Attesting Officer*

C. MARSHALL DANN
*Commissioner of Patents and Trademarks*